US009935468B2

(12) United States Patent
Iwawaki (10) Patent No.: US 9,935,468 B2
(45) Date of Patent: Apr. 3, 2018

(54) POWER RECEIVING APPARATUS AND POWER RECEIVING METHOD (75) Inventor: Keisuke Iwawaki, Ota ward (JP)

(73) Assignee: Pioneer Corporation, Kanagawa (JP)

(*) Notice: Subject to any disclaimer, the term of this patent is extended or adjusted under 35 U.S.C. 154(b) by 639 days.

(21) Appl. No.: 14/383,758

(22) PCT Filed: Mar. 13, 2012

(86) PCT No.: PCT/JP2012/056385
§ 371 (c)(1),
(2), (4) Date: Sep. 17, 2014

(87) PCT Pub. No.: WO2013/136431
PCT Pub. Date: Sep. 19, 2013

(65) Prior Publication Data
US 2015/0188319 A1   Jul. 2, 2015

(51) Int. Cl.
*H02J 17/00* (2006.01)
*H02J 5/00* (2016.01)
(Continued)

(52) U.S. Cl.
CPC ............. *H02J 5/005* (2013.01); *H02J 7/025* (2013.01); *H02J 17/00* (2013.01); *H02J 50/12* (2016.02); *H02J 50/70* (2016.02); *H02M 3/02* (2013.01)

(58) Field of Classification Search
USPC ......................................... 307/104
See application file for complete search history.

(56) References Cited

U.S. PATENT DOCUMENTS

2009/0127937 A1* 5/2009 Widmer .................. H01F 38/14
307/149
2010/0187913 A1* 7/2010 Smith ..................... H02J 5/005
307/104
(Continued)

FOREIGN PATENT DOCUMENTS

JP    2010-239847    10/2010
JP    2011-147213     7/2011
WO   WO2011/086445    7/2011

OTHER PUBLICATIONS

Moriwaki et al., (Basic Study on Reduction of Reflected Power Using DC/DC Converters in Wireless Power Transfer System via Magnetic Resonant Coupling), Dec. 12, 2011.*

(Continued)

*Primary Examiner* — Rexford Barnie
*Assistant Examiner* — Xuan Ly
(74) *Attorney, Agent, or Firm* — Young & Thompson (57) ABSTRACT A power receiving apparatus (105) is provided with: a power reception unit (106) disposed at a distance from and opposed to a power transmission unit (104) of the power transmitting apparatus (101); a direct current (DC) voltage changing device (108) which constitutes one portion of a power receiving circuit configured to electrically connect the power reception unit and an electrical load (109) and which can change DC voltage supplied to the electrical load; and a controlling device (112) configured to control the DC voltage changing device to change the DC voltage to bring a current phase difference between current of the power transmission unit and current of the power reception unit close to 180 degrees when the electric power is transmitted and received between the power transmission unit and the power reception unit, the current phase difference corresponding to overall resonant frequency.

2 Claims, 6 Drawing Sheets (51) Int. Cl.
*H02M 3/02* (2006.01)
*H02J 7/02* (2016.01)
*H02J 50/12* (2016.01)
*H02J 50/70* (2016.01)

(56) References Cited

U.S. PATENT DOCUMENTS

2010/0244578 A1  9/2010  Yoshikawa
2012/0326499 A1  12/2012  Ichikawa et al.

OTHER PUBLICATIONS

European Official Action—12 871 009.2-1804—dated Nov. 30, 2016.
Yusuke Moriwaki et al.: "Basic Study on Reduction of Reflected Power Using DC/DC Converters in Wireless Power Transfer System via Magnetic Resonant Coupling", IEEE 33rd International Telecommunications Energy Conference, Dec. 12, 2011 (Dec. 12, 2011), XP032071248, DOI: 10.1109/INTLEC.2011.6099737.
International Search Report, PCT/JP2012/056385, dated Jun. 19, 2012.

\* cited by examiner

POWER RECEIVING APPARATUS AND POWER RECEIVING METHOD

TECHNICAL FIELD

The present invention relates to a power receiving apparatus and a power receiving method in a system in which electric power is transmitted and received in a wireless manner between a power transmission unit and a power reception unit.

BACKGROUND ART

On this type of apparatus, for example, the power transmission unit and the power reception unit are magnetically coupled by magnetic resonance, electromagnetic induction, or the like. This provides power transfer in the wireless manner between the power transmission unit and the power reception unit. On this type of apparatus, a leakage electromagnetic field is reduced between the power transmission unit and the power reception unit.

For example, Patent document 1 discloses an apparatus configured to monitor current flowing through each of a primary (power transmission side) coil and a secondary (power reception side) coil, and to adjust frequency and a resonance capacitor such that the primary coil and the secondary coil resonate in a state in which the current flowing through the primary coil is opposite to the current flowing through the secondary coil.

Alternatively, Patent document 2 discloses the following technology; namely, if a power transmitting coil is to some extent close to a power receiving coil, then, two drive frequencies with peak transmitted energy appear, in the magnetic resonance between the power transmitting coil and the power receiving coil, and thus, the drive frequency on a high frequency side is used for the drive to set a current phase difference between the power transmission and reception in anti-phase, thereby relatively weakening a generated magnetic field.

PRIOR ART DOCUMENTS

Patent Documents

Patent document 1: Japanese Patent Application Laid Open No. 2011-147213
Patent document 2: Japanese Patent Application Laid Open No. 2010-239847

SUMMARY OF INVENTION

Subject to be Solved by the Invention

In the aforementioned Background Art, however, for example, consideration is not given to a condition in which the two drive frequencies with the peak transmitted energy appear, or to a correlation between impedance associated with a load such as a battery and a current phase between the power transmitting coil and the power receiving coil. Then, it is likely difficult to appropriately reduce the leakage electromagnetic field between the power transmission unit and the power reception unit, which is technically problematic.

In view of the aforementioned problems, it is therefore an object of the present invention to provide a power receiving apparatus and a power receiving method in which the leakage electromagnetic field can be appropriately reduced, for example, regardless of a variation in the load and a variation in the distance between the power transmitting coil and the power receiving coil.

Means for Solving the Subject

The above object of the present invention can be solved by a power receiving apparatus configured to transmit and receive electric power in a wireless manner with a power transmitting apparatus, said power receiving apparatus is provided with: a power reception unit disposed at a distance from and opposed to a power transmission unit of the power transmitting apparatus; a direct current (DC) voltage changing device which constitutes one portion of a power receiving circuit by electrically connecting the power reception unit and an electrical load and which can change DC voltage supplied to the electrical load; and a controlling device configured to control said DC voltage changing device to change the DC voltage to bring a current phase difference between current of the power transmission unit and current of the power reception unit close to 180 degrees when the electric power is transmitted and received between the power transmission unit and the power reception unit, the current phase difference corresponding to overall resonant frequency which is resonant frequency associated with an overall system including said power receiving apparatus and the power transmitting apparatus.

According to the power receiving apparatus of the present invention, the power receiving apparatus is configured to transmit and receive electric power in a wireless manner with a power transmitting apparatus, for example, by magnetic resonance, electromagnetic induction, or the like. The power receiving apparatus is provided with the power reception unit, the DC voltage changing device, and the controlling device.

The power reception unit is disposed at a distance from and opposed to the power transmission unit of the power transmitting apparatus. Here, each of the power reception unit and the power transmission unit is configured to have predetermined inductance. Moreover, according to a distance (i.e. a gap) between the power reception unit and the power transmission unit and a relative position in a horizontal direction between the power reception unit and the power transmission unit, a coupling coefficient between the power reception unit and the power transmission unit changes.

The DC voltage changing device constitutes one portion of the power receiving circuit which electrically connects the power reception unit and the electrical load such as, for example, a battery (i.e. the DC voltage changing device, the electrical load, and the power reception unit are electrically connected to each other). The DC voltage changing device is configured to change the DC voltage supplied to the electrical load of the power receiving circuit. The "DC voltage of the power receiving circuit" means DC voltage associated with DC power converted by a rectifier or the like from alternating current (AC) power received via the power reception unit. The "DC voltage supplied to the electrical load" means DC voltage associated with the DC power supplied to the electrical power, out of the DC voltage of the power receiving circuit. The DC voltage changing device increases or reduces the DC voltage associated with the DC power converted by the rectifier or the like, or performs similar actions, thereby changing the DC voltage supplied to the electrical load.

The controlling device, which is provided, for example, with a memory, a processor, and the like, controls the DC voltage changing device to change the DC voltage to bring the current phase difference between the current of the power transmission unit and the current of the power reception unit close to 180 degrees when the electric power is transmitted and received between the power transmission unit and the power reception unit, wherein the current phase difference corresponds to the overall resonant frequency which is the resonant frequency associated with the overall system including the power receiving apparatus and the power transmitting apparatus. The "overall resonant frequency" is resonant frequency which relatively reduces reactive power, and is resonance frequency at which the power transmitted from the power transmission unit to the power reception unit has a peak.

Here, according to the study of the present inventor, the following matter has been found. In the case of the power transmission in the wireless manner, there is a predetermined gap between the power transmission unit and the power reception unit. Thus, the coupling coefficient between the power transmission unit and the power reception unit is relatively low, and a relatively large leakage electromagnetic field is generated. In order to reduce the leakage electromagnetic field, there is proposed a method of bringing the current phase difference between the current of the power transmission unit and the current of the power reception unit close to anti-phase (i.e. 180 degrees).

However, even if optimal drive frequency (corresponding to the "overall resonant frequency" of the present invention) is set in advance to bring the current phase different close to anti-phase, if there is the electrical load in which the load varies according to the state of charge, such as, for example, a battery, a relation between the optimal drive frequency and the current phase difference changes according to the state of charge. Then, there is a possibility that the leakage electromagnetic field is not reduced.

In the present invention, therefore, the DC voltage changing device is controlled by the controlling device to change the DC voltage to bring the current phase difference corresponding to the overall resonant frequency close to 180 degrees, when the electric power is transmitted and received between the power transmission unit and the power reception unit. By virtue of such a configuration, it is possible to appropriately reduce the leakage electromagnetic field even if the load of the electrical load changes according to the state of charge, such as, for example, a battery.

In one aspect of the power receiving apparatus of the present invention, the power receiving circuit includes a capacitor which is electrically connected in series with the power reception unit, said DC voltage changing device can change combined impedance between impedance associated with the electrical load and impedance associated with said DC voltage changing device, by changing the DC voltage, and said controlling device brings the current phase difference close to 180 degrees by controlling said DC voltage changing device to change the combined impedance in a direction in which the combined impedance becomes less than excitation reactance.

According to this aspect, the capacitor as a resonance capacitor which resonates with the power reception unit is electrically connected in series with the power reception unit. In this case, if the combined impedance between the impedance associated with the electrical load and the impedance associated with the DC voltage changing device is changed in the direction in which the combined impedance becomes less than the excitation reactance associated with the power transmission unit and the power reception unit, the current phase difference corresponding to the overall resonant frequency comes close to 180 degrees, which has been found from the study of the present inventor.

Thus, the controlling device controls the DC voltage changing device to change the combined impedance in the direction in which the combined impedance becomes less than the excitation reactance, thereby bringing the current phase difference close to 180 degrees. As a result, it is possible to appropriately reduce the leakage electromagnetic field, relatively easily.

Alternatively, in another aspect of the power receiving apparatus of the present invention, the power receiving circuit includes a capacitor which is electrically connected in parallel with the power reception unit, said DC voltage changing device can change combined impedance between impedance associated with the electrical load and impedance associated with said DC voltage changing device, by changing the DC voltage, and said controlling device brings the current phase difference close to 180 degrees by controlling said DC voltage changing device to change the combined impedance in a direction in which the combined impedance becomes greater than excitation reactance.

According to this aspect, the capacitor as the resonance capacitor which resonates with the power reception unit is electrically connected in parallel with the power reception unit. In this case, if the combined impedance between the impedance associated with the electrical load and the impedance associated with the DC voltage changing device is changed in the direction in which the combined impedance becomes greater than the excitation reactance associated with the power transmission unit and the power reception unit, the current phase difference corresponding to the overall resonant frequency comes close to 180 degrees, which has been found from the study of the present inventor.

Thus, the controlling device controls the DC voltage changing device to change the combined impedance in the direction in which the combined impedance becomes greater than the excitation reactance, thereby bringing the current phase difference close to 180 degrees. As a result, it is possible to appropriately reduce the leakage electromagnetic field, relatively easily.

In another aspect of the power receiving apparatus of the present invention, said controlling device includes an obtaining device configured to obtain power transmission side resonant frequency which is resonant frequency of alternating current power of the power transmitting apparatus, and said controlling device obtains the excitation reactance on the basis of the obtained power transmission side resonant frequency.

According to this aspect, it is possible to relatively easily obtain the excitation reactance, which is extremely useful in practice. The resonant frequency of the AC power herein is frequency at which the phase of voltage of the AC power and the phase of current match each other and at which power factor is maximal.

In another aspect of the power receiving apparatus of the present invention, said controlling device includes an impedance detecting device configured to detect the impedance associated with the electrical load, and said controlling device controls said DC voltage changing device to change the combined impedance to set the combined impedance within a predetermined range which is set in advance to bring the current phase difference close to 180 degrees, on the basis of the detected impedance associated with the electrical load.

According to this aspect, it is possible to relatively easily bring the current phase difference close to 180 degrees, which is extremely useful in practice.

The above object of the present invention can be solved by a power receiving method on a power receiving apparatus configured to transmit and receive electric power in a wireless manner with a power transmitting apparatus, said power receiving apparatus comprising: a power reception unit disposed at a distance from and opposed to a power transmission unit of the power transmitting apparatus; and a direct current (DC) voltage changing device which constitutes one portion of a power receiving circuit by electrically connecting the power reception unit and an electrical load and which can change DC voltage supplied to the electrical load, said power receiving method is provided with: a controlling process of controlling said DC voltage changing device to change the DC voltage to bring a current phase difference between current of the power transmission unit and current of the power reception unit close to 180 degrees when the electric power is transmitted and received between the power transmission unit and the power reception unit, the current phase difference corresponding to overall resonant frequency which is resonant frequency associated with an overall system including said power receiving apparatus and the power transmitting apparatus.

The power receiving method of the present invention can appropriately reduce the leakage electromagnetic field even if the load of the electrical load changes according to the state of charge, such as, for example, a battery, as in the power receiving apparatus of the present invention described above.

The power receiving method of the present invention can adopt the same various aspects as those of the power receiving apparatus of the present invention described above.

The operation and other advantages of the present invention will become more apparent from embodiments explained below.

MODES FOR CARRYING OUT THE INVENTION

Hereinafter, embodiments of the power receiving apparatus of the present invention will be explained with reference to the drawings.

<First Embodiment>

A first embodiment of the power receiving apparatus of the present invention will be explained with reference to FIG. 1 to FIG. 9.

(Configuration of Wireless Power Feeding Apparatus)

Figure 1:
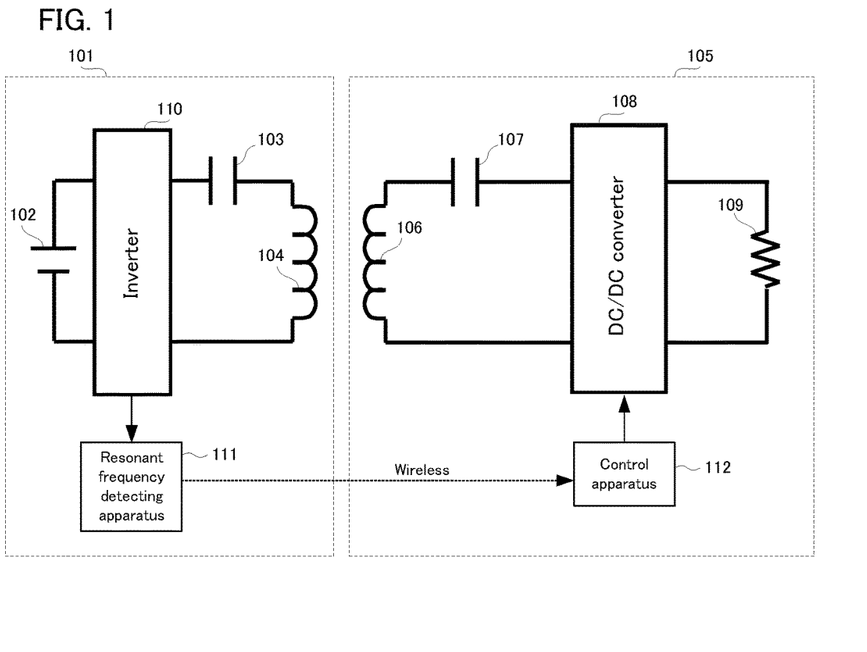
FIG. 1 is a block diagram illustrating a configuration of a wireless power feeding apparatus in a first embodiment.

Firstly, a configuration of a wireless power feeding apparatus in the embodiment will be explained with reference to FIG. 1. FIG. 1 is a block diagram illustrating the configuration of the wireless power feeding apparatus in the first embodiment.

In FIG. 1, the wireless power feeding apparatus is provided with a power transmitting apparatus 101 and a power receiving apparatus 105. The wireless power feeding apparatus is an apparatus configured to supply electric power from the power transmitting apparatus 101 to the power receiving apparatus 105 in a wireless manner, for example, by electromagnetic induction, magnetic resonance or the like between the power transmitting apparatus 101 to the power receiving apparatus 105, thereby supplying electric power to an electrical load such as, for example, a battery.

The power transmitting apparatus 101 is provided with a direct current (DC) power supply 102, a primary resonance capacitor 103, a primary coil (or antenna) 104, an inverter 110 and a resonant frequency detecting apparatus 111. By the DC power supply 102 and the inverter 110, high-frequency alternating current (AC) power is supplied to the primary coil 104. The power transmitting apparatus 101 may be provided with a high-frequency AC power supply, instead of the DC power supply 102 and the inverter 110.

The power receiving apparatus 105 is provided with a secondary coil (or antenna) 106, a secondary resonance capacitor 107, a DC/DC converter 108, an electrical load 109, and a control apparatus 112. The DC/DC converter 108, for example, increases or reduces DC voltage associated with DC power converted by, for example, a rectifier (not illustrated), or performs similar actions, thereby changing (or controlling) DC voltage supplied to the electrical load 109.

The "primary coil 104", the "secondary coil 106", and the "DC/DC converter 108" in the embodiment are one example of the "power transmission unit", the "power reception unit" and the "direct current (DC) voltage changing device" of the present invention, respectively.

COMPARATIVE EXAMPLE

Now, with reference to a wireless power feeding apparatus in a comparative example, the characteristics of resonant frequency will be explained.

Firstly, the wireless power feeding apparatus in the comparative example will be explained with reference to FIG. 2.

Figure 2:
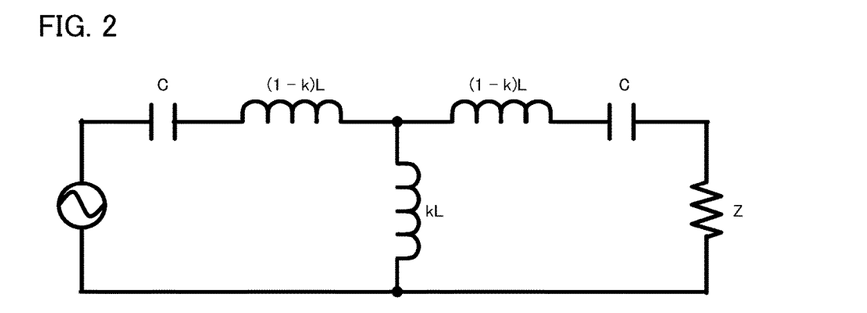
FIG. 2 is an equivalent circuit diagram illustrating a wireless power feeding apparatus in a comparative example.

FIG. 2 is an equivalent circuit diagram illustrating the wireless power feeding apparatus in the comparative example.

In FIG. 2, it is assumed that the inductance of each of a primary coil and a secondary coil is "L", and that a coupling coefficient between the primary coil and the secondary coil is "k". The mutual inductance between the primary coil and the secondary coil is expressed as "kL", and leakage inductance is expressed as "(1−k)L". It is also assumed that each of the capacitance of a primary side resonance capacitor and the capacitance of a secondary side resonance capacitor is "C", and that load impedance associated with an electrical load is "Z".

Figure 3:
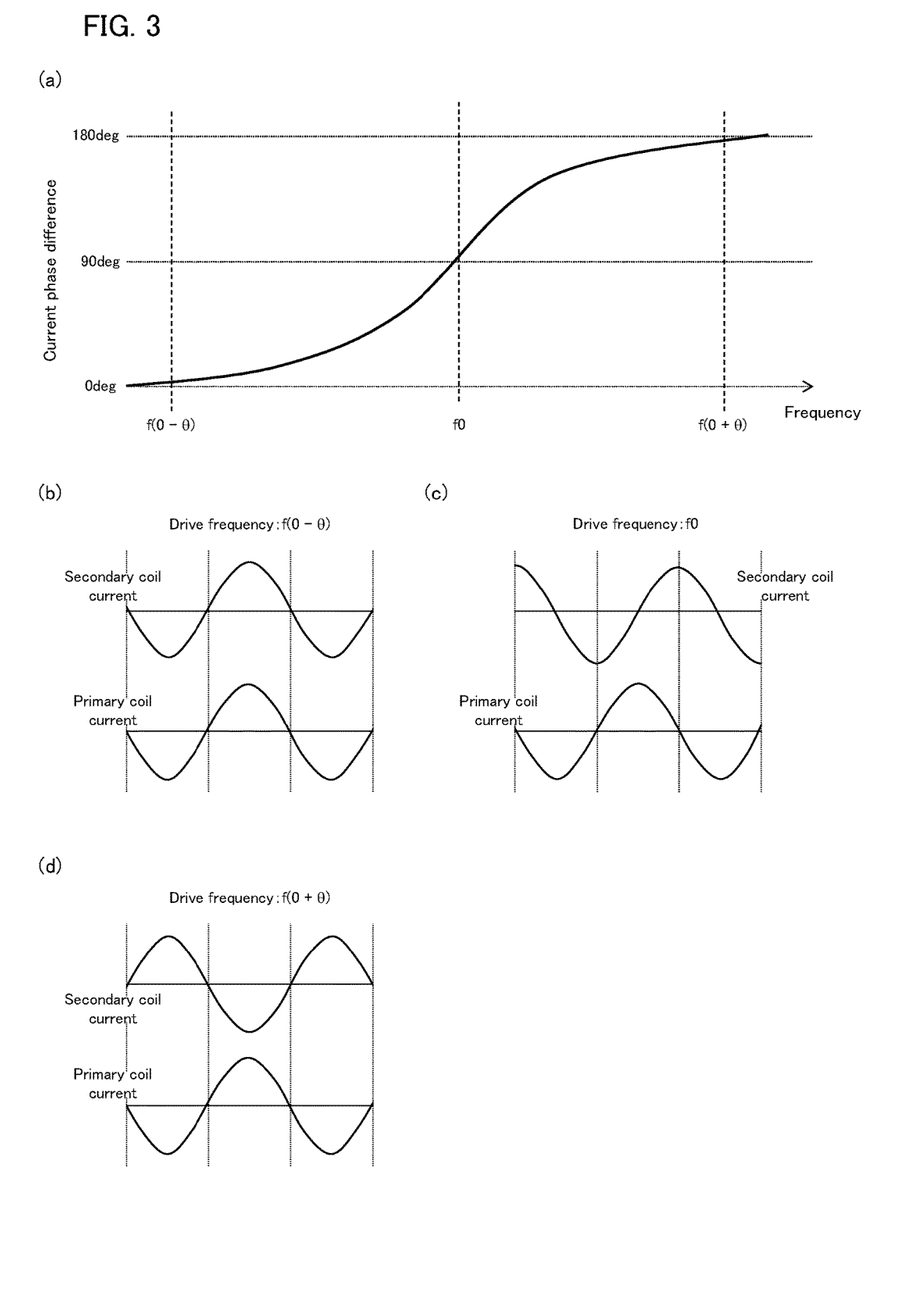
FIG. 3 are one example of a relation between drive frequency and a current phase difference between a primary coil and a secondary coil, and one example of a current phase at each drive frequency.

With reference to FIG. 3, an explanation will be given to a current phase difference between the primary coil and the secondary coil, and a current phase of each of the primary coil and the secondary coil, when drive frequency is changed on the wireless power feeding apparatus as described above. FIG. 3 are one example of a relation between the drive frequency and the current phase difference, and one example of the current phase of each of the primary coil and the secondary coil. In FIG. 3, "f0" is the resonant frequency of the secondary coil and the secondary side resonance capacitor (hereinafter referred to as "secondary side self-resonant frequency").

If the drive frequency is equal to the secondary side self-resonant frequency f0, the current phase of each of the primary coil and the secondary coil is as illustrated in FIG. 3(c), and the current phase difference is 90 degrees (refer to FIG. 3(a)). If the drive frequency is less than the secondary side self-resonant frequency f0, the current phase of each of the primary coil and the secondary coil is as illustrated in FIG. 3(b), and the current phase difference is less than 90 degrees (i.e. on an in-phase side with respect to 90 degrees) (refer to FIG. 3(a)). On the other hand, if the drive frequency is greater than the secondary side self-resonant frequency f0, the current phase of each of the primary coil and the secondary coil is as illustrated in FIG. 3(d), and the current phase difference is greater than 90 degrees (i.e. on an anti-phase side with respect to 90 degrees) (refer to FIG. 3(a)).

Figure 4:
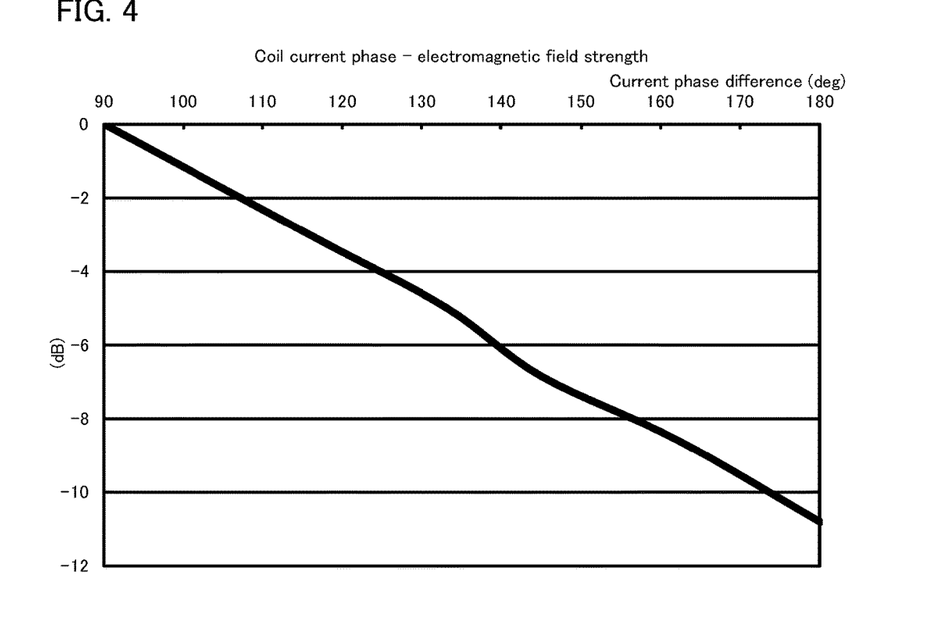
FIG. 4 is a characteristic diagram illustrating one example of a relation between a current phase difference and leakage electromagnetic field strength.

Next, a relation of the current phase difference between the primary coil and the secondary coil with leakage electromagnetic field strength will be explained with reference to FIG. 4. FIG. 4 is a characteristic diagram illustrating one example of the relation between the current phase difference and the leakage electromagnetic field strength.

As illustrated in FIG. 4, as the current phase difference comes closer to 180 degrees (i.e. anti-phase), the leakage electromagnetic field strength decreases. From this, it is possible to effectively reduce the leakage electromagnetic field by driving the wireless power feeding apparatus at the drive frequency at which the current phase difference is near 180 degrees.

By the way, in order to perform efficient power transmission from the power transmitting apparatus to the power receiving apparatus, it is necessary to set the drive frequency at resonant frequency associated with the wireless power feeding apparatus (corresponding to "overall resonant frequency"). The resonant frequency associated with the wireless power feeding apparatus will be explained with reference to FIG. 5 to FIG. 7. Each of FIG. 5 to FIG. 7 is a view illustrating one example of a relation between frequency and the current phase difference between the primary coil and the secondary coil, and a relation between frequency and an input current phase, for each case of a relation between excitation reactance and the load impedance.

Figure 5:
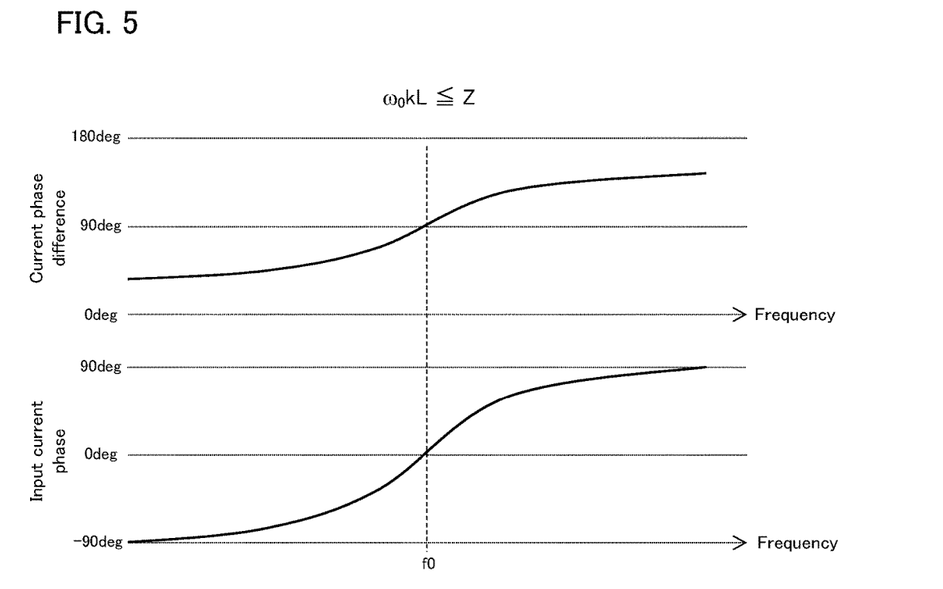
FIG. 5 is a view illustrating one example of a relation between frequency and a current phase difference between a primary coil and a secondary coil, and a relation between frequency and an input current phase, in the case of $\omega_0 kL \leq Z$.

As illustrated in FIG. 5, if the load impedance Z is greater than or equal to the excitation reactance $\omega_0 kL$, a resonance point (i.e. a frequency at which the input current phase is "0 deg") is only the secondary side self-resonant frequency f0.

Figure 6:
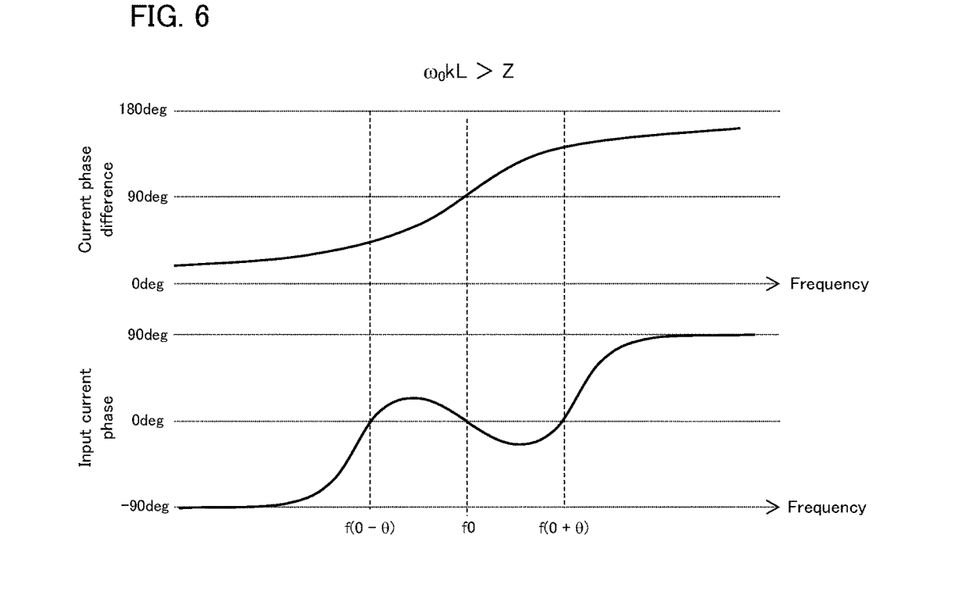
FIG. 6 is a view illustrating one example of the relation between frequency and the current phase difference between the primary coil and the secondary coil, and the relation between frequency and the input current phase, in the case of $\omega_0 kL > Z$.

On the other hand, as illustrated in FIG. 6, if the load impedance Z is less than the excitation reactance $\omega_0 kL$, there are three resonance points which are not only the secondary side self-resonant frequency f0 but also a frequency $f(0+\theta)$ and a frequency $(0-\theta)$. In this case, if the drive frequency is set at the frequency $f(0+\theta)$, the current phase difference between the primary coil and the secondary coil comes close to 180 degrees, and it is thus possible to reduce the leakage electromagnetic field.

Figure 7:
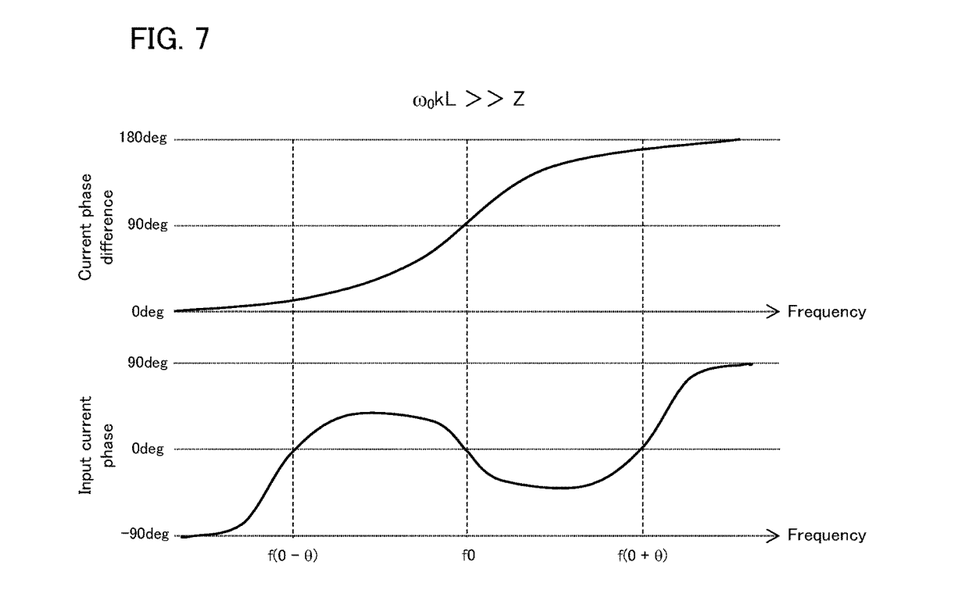
FIG. 7 is a view illustrating one example of the relation between frequency and the current phase difference between the primary coil and the secondary coil, and the relation between frequency and the input current phase, in the case of $\omega_0 kL \gg Z$.

Moreover, as illustrated in FIG. 7, if the load impedance Z is significantly less than the excitation reactance $\omega_0 kL$, the current phase difference between the primary coil and the secondary coil corresponding to the frequency $f(0+\theta)$ comes closer to 180 degrees than the case illustrated in FIG. 6, and it is thus possible to further reduce the leakage electromagnetic field.

By the way, the coupling coefficient between the primary coil and the secondary coil varies due to an influence such as, for example, a gap between the primary coil and the secondary coil. Moreover, in the electrical load in which current and voltage vary according to its state of charge, such as a battery, the load impedance Z varies upon power supply. Thus, for example, if the drive frequency is fixed when electric power is supplied to the battery, reactive power likely increases according to the state of charge of the battery even though the leakage electromagnetic field can be reduced. On the other hand, for example, if the drive frequency is changed according to the state of charge of the battery when electric power is supplied to the battery, it is likely hard to reduce the leakage electromagnetic field even though the increase in the reactive power can be suppressed.

(Operation of Wireless Power Feeding Apparatus in First Embodiment)

Figure 8:
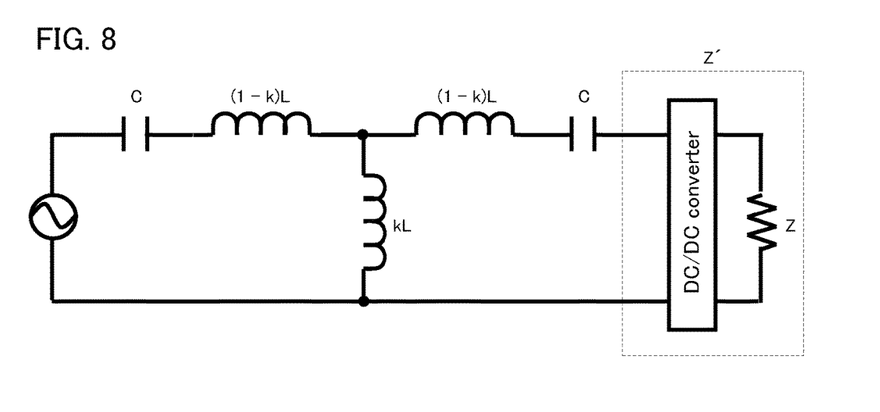
FIG. 8 is an equivalent circuit diagram illustrating the wireless power feeding apparatus in the first embodiment.

Therefore, the present inventor has focused on the relation between the excitation reactance $\omega_0 kL$ and the load impedance Z. In the embodiment, instead of the load impedance Z, combined impedance Z' between impedance associated with the DC/DC converter 108 (refer to FIG. 1) and the load impedance Z associated with the electrical load 109 (refer to FIG. 1) is used as illustrated in FIG. 8. FIG. 8 is an equivalent circuit diagram illustrating the wireless power feeding apparatus in the first embodiment.

Figure 9:
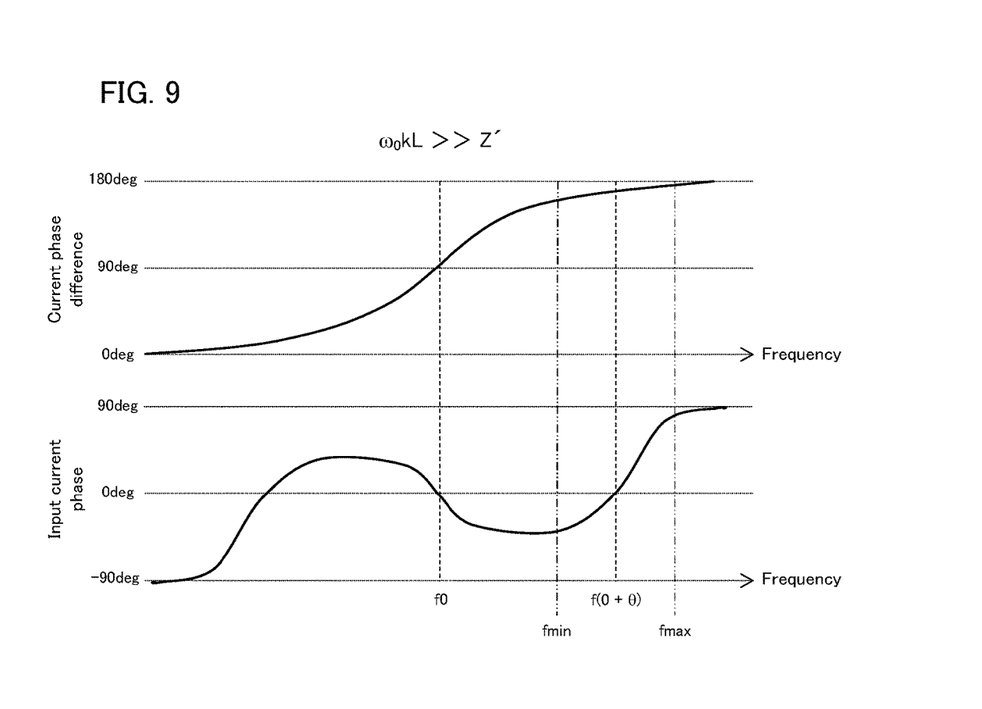
FIG. 9 is a view illustrating one example of the relation between frequency and the current phase difference between the primary coil and the secondary coil, and the relation between frequency and the input current phase, in the case of $\omega_0 kL \gg Z'$.

If the combined impedance Z' is significantly less than the excitation reactance $\omega_0 kL$, as illustrated in FIG. 9, there are three resonance points which are the secondary side self-resonant frequency f0, the frequency $f(0+\theta)$ and the frequency $(0-\theta)$. The current phase difference between the primary coil and the secondary coil corresponding to the frequency $f(0+\theta)$ is a value close to 180 degrees. In other words, it is clear that the use of the combined impedance Z' instead of the load impedance Z also shows the same tendency as that in the load impedance Z.

Therefore, if the DC/DC converter 108 is controlled such that the relation between the excitation reactance $\omega_0 kL$ and the combined impedance Z' maintains a predetermined state even if there is a change in the load impedance Z and the coupling coefficient k, it is possible to perform the efficient power transmission by suppressing the increase in the reactive power while reducing the leakage electromagnetic field.

Specifically, the control apparatus 112 of the power receiving apparatus 105 obtains the resonant frequency of the inverter 110 detected by the resonant frequency detecting apparatus 111 of the power transmitting apparatus 101, for example, by wireless communication.

The resonant frequency detecting apparatus 111 may detect, for example, each of the current phase and the voltage phase of the inverter 110 and may estimate the resonant frequency of the inverter 110 from a phase difference between the detected current phase and the detected voltage phase.

The control apparatus 112 estimates the resonance point (corresponding to the "overall resonant frequency" of the present invention) on the basis of the obtained resonant frequency of the inverter 110. Since various known aspects can be applied to a method of estimating the resonance point, the explanation of the resonance point estimation method will be omitted to avoid complicated explanation.

Then, the control apparatus 112 controls the DC/DC converter 108 to set the combined impedance Z' which brings the current phase difference between the primary coil 104 and the secondary coil 106 corresponding to the estimated resonance point close to 180 degrees. Specifically, the control apparatus 112 controls the DC/DC converter 108 to change the DC voltage supplied to the electrical load 109 so as to set a desired combined impedance Z'. This results in a change in the resonance point, and it is thus possible to bring the current phase difference between the primary coil 104 and the secondary coil 106 close to 180 degrees.

If the combined impedance Z' is excessively reduced in order to bring the current phase difference between the primary coil 104 and the secondary coil 106 close to 180 degree, then, an increase in current increases a loss in the secondary coil 106 and reduces power transmission efficiency. Moreover, it has been found from the study of the present inventor that the leakage electromagnetic field increases (or the effect of reducing the leakage electromagnetic field decreases) because the magnetic field generated from the coil increases. It is thus desirable to provide a lower limit for the combined impedance Z', or an upper limit for the drive frequency (refer to "fmax" in FIG. 9).

In practice, the power receiving apparatus 105 may be configured as follows. The range of the drive frequency is set such that the leakage electromagnetic field is within an allowable range (for example, "fmin to fmax" in FIG. 9). Then, if the estimated resonance point is less than the lower limit of the set range of the drive frequency, the control apparatus 112 controls the DC/DC converter 108 to reduce the combined impedance Z'. On the other hand, if the estimated resonance point is greater than the upper limit of the set range of the drive frequency, the control apparatus 112 controls the DC/DC converter 108 to increase the combined impedance Z'. The range of the drive frequency may be set, as occasion demands, in view of specification of the wireless power feeding apparatus or the like.

<Second Embodiment>

Figure 10:
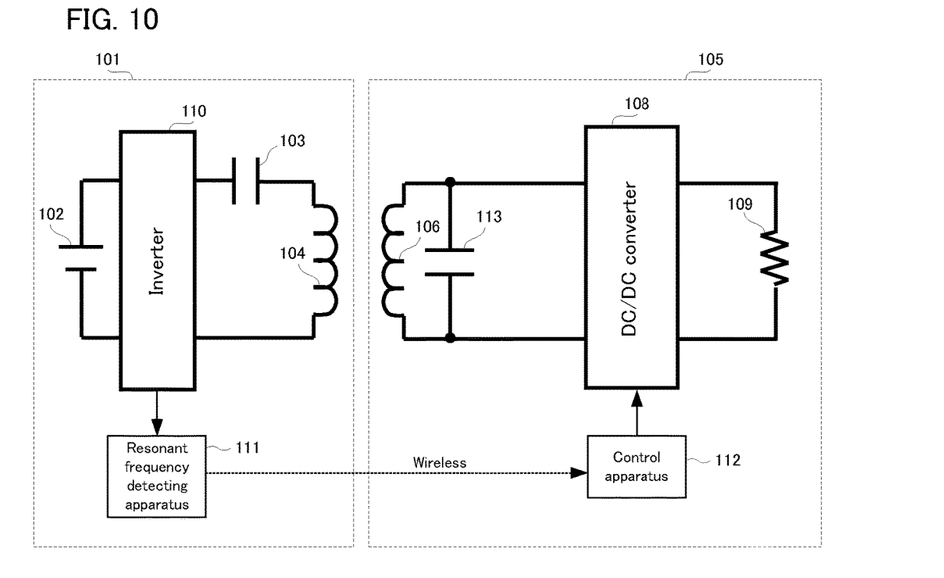
FIG. 10 is a block diagram illustrating a configuration of a wireless power feeding apparatus in a second embodiment.

A second embodiment of the power receiving apparatus of the present invention will be explained with reference to FIG. 10. The second embodiment is the same as that of the first embodiment, except that the secondary resonance capacitor is electrically connected in parallel with the secondary coil. Thus, in the second embodiment, a duplicated explanation of the first embodiment will be omitted, and common parts on the drawing will carry the same reference numerals. Basically, only a different point will be explained with reference to FIG. 10. FIG. 10 is a block diagram illustrating a configuration of the wireless power feeding apparatus in the second embodiment, to the same effect as in FIG. 1.

As illustrated in FIG. 10, on the power receiving apparatus 105, a secondary resonance capacitor 113 is electrically connected in parallel with the secondary coil 106.

In the embodiment, as opposed to the first embodiment described above, as the combined impedance Z' becomes greater than the excitation reactance $\omega_0 kL$, the current phase difference between the primary coil 104 and the secondary coil 106 corresponding to the resonance point comes closer to the 180 degrees.

Thus, for example, if the estimated resonance point is less than the lower limit of the range of the set range of the drive frequency (refer to "fmin" in FIG. 9), the control apparatus 112 controls the DC/DC converter 108 to increase the combined impedance Z'. On the other hand, if the estimated resonance point is greater than the upper limit of the range of the set range of the drive frequency (refer to "fmax" in FIG. 9), the control apparatus 112 controls the DC/DC converter 108 to reduce the combined impedance Z'.

<Third Embodiment>

Figure 11:
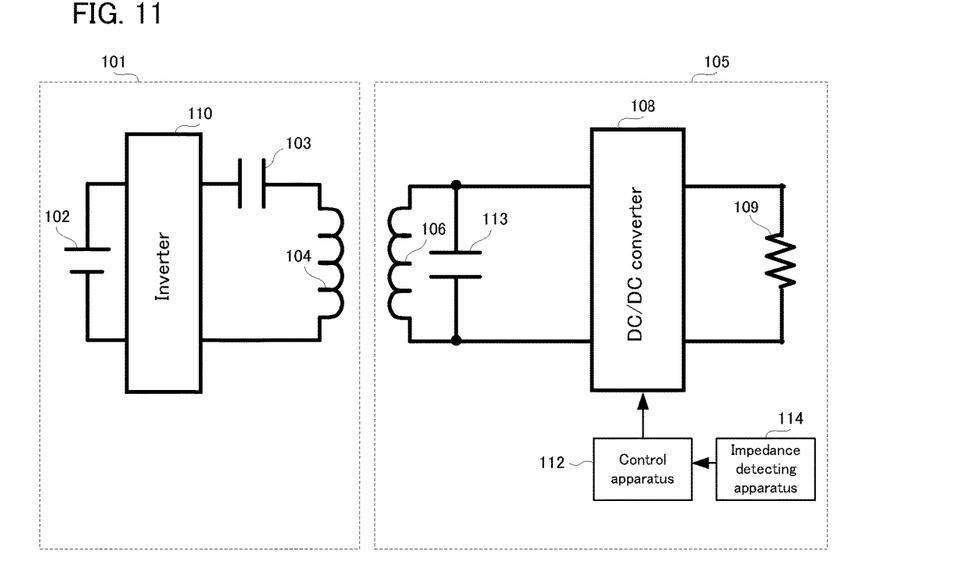
FIG. 11 is a block diagram illustrating a configuration of a wireless power feeding apparatus in a third embodiment.

A third embodiment of the power receiving apparatus of the present invention will be explained with reference to FIG. 11. The third embodiment is the same as that of the second embodiment, except that the power receiving apparatus is provided with an impedance detecting apparatus. Thus, in the third embodiment, a duplicated explanation of the second embodiment will be omitted, and common parts on the drawing will carry the same reference numerals. Basically, only a different point will be explained with reference to FIG. 11. FIG. 11 is a block diagram illustrating a configuration of the wireless power feeding apparatus in the third embodiment, to the same effect as in FIG. 1.

As illustrated in FIG. 11, the power receiving apparatus 105 is provided with an impedance detecting apparatus 114 configured to detect the load impedance Z associated with the electrical load 109.

According to the study of the present inventor, the following matter has been found. For example, if a relative position between the primary coil 104 and the secondary coil 106 can be maintained to be constant all the time, for example, by a guide rail or the like, then, the coupling coefficient k between the primary coil 104 and the secondary coil 106 is constant (or can be deemed to be practically constant).

It is thus unnecessary to consider the variation in the coupling coefficient k. Therefore, the DC/DC converter 108 may be controlled to set the combined impedance Z' at a value set in advance or within a range set in advance, according to the variation in the load impedance Z.

Thus, in the embodiment, the control apparatus 112 controls the DC/DC converter 108 to set the combined impedance Z' at a value set in advance or within a range set in advance, on the basis of the load impedance Z detected by the impedance detecting apparatus 114.

The "value set in advance" is a value at which the current phase difference between the primary coil 104 and the secondary coil 106 corresponding to the resonance point is near 180 degrees and at which the leakage electromagnetic field is within the allowable range. In the same manner, the "range set in advance" is a range in which the current phase difference between the primary coil 104 and the secondary coil 106 corresponding to the resonance point is near 180 degrees and in which the leakage electromagnetic field is within the allowable range.

The present invention is not limited to the aforementioned embodiments, but various changes may be made, if desired, without departing from the essence or spirit of the invention which can be read from the claims and the entire specification. A power receiving apparatus and a power receiving method which involve such changes are also intended to be within the technical scope of the present invention.

DESCRIPTION OF REFERENCE NUMERALS 101 power transmitting apparatus
102 direct current power supply
103 primary resonance capacitor
104 primary coil
105 power receiving apparatus
106 secondary coil
107, 113 secondary resonance capacitor
108 DC/DC converter
109 electrical load
110 inverter
111 resonant frequency detecting apparatus
112 control apparatus
114 impedance detecting apparatus

The invention claimed is:

1. A power receiving apparatus in combination with a power transmitting apparatus, the power receiving apparatus configured to transmit and receive electric power in a wireless manner with the power transmitting apparatus, said power receiving apparatus comprising:
   a power reception unit;
   a direct current (DC) voltage changing device which electrically connects the power reception unit and an electrical load and which can change DC voltage supplied to the electrical load; and
   a controlling device configured to control the DC voltage supplied from said DC voltage changing device to the electrical load to bring a current phase difference between current of a power transmission unit of the power transmitting apparatus and current of the power reception unit close to 180 degrees when the electric power is transmitted and received between the power transmission unit and the power reception unit, wherein,
   the power transmitting apparatus is comprised of a direct current (DC) power supply, a primary resonance capacitor, a primary coil in series with the primary resonance capacitor, an inverter and a resonant frequency detecting apparatus connected to the inverter, by the DC power supply and the inverter, high-frequency alternating current (AC) power is supplied to the primary coil for transfer to the power reception unit, and
   the controlling device is comprised of a control apparatus connected to the direct current (DC) voltage changing device and wirelessly connected to the resonant frequency detecting apparatus of power transmitting apparatus, the control apparatus configured to i) obtain a resonant frequency of the inverter detected by the resonant frequency detecting apparatus of the power transmitting apparatus, and ii) using the obtained resonant frequency of the inverter, control the DC voltage supplied from said DC voltage changing device to the electrical load, to change a combined impedance between impedance associated with the electrical load and an impedance associated with said DC voltage changing device, said controlling apparatus controlling the DC voltage supplied from said DC voltage changing device to change the combined impedance in a direction in which the combined impedance becomes changes with respect to an excitation reactance associated with the power transmission unit and the power reception unit such that the DC voltage supplied from said DC voltage changing device to the electrical load brings the current phase difference between current of the power transmission unit of the power transmitting apparatus and current of the power reception unit close to 180 degrees when the electric power is transmitted and received between the power transmission unit and the power reception unit.

2. A power receiving apparatus in combination with a power transmitting apparatus, the power receiving apparatus configured to transmit and receive electric power in a wireless manner with the power transmitting apparatus, said power receiving apparatus comprising:
   a power reception unit;
   a direct current (DC) voltage changing device which electrically connects the power reception unit and an electrical load and which can change DC voltage supplied to the electrical load; and
   a controlling device configured to control the DC voltage supplied from said DC voltage changing device to the electrical load to bring a current phase difference between current of a power transmission unit of the power transmitting apparatus and current of the power reception unit close to 180 degrees when the electric power is transmitted and received between the power transmission unit and the power reception unit, wherein,
   the power transmitting apparatus is comprised of a direct current (DC) power supply, a primary coil, an inverter and a resonant frequency detecting apparatus connected to the inverter, by the DC power supply and the inverter, high-frequency alternating current (AC) power is supplied to the primary coil for transfer to the power reception unit, and
   the controlling device is comprised of a control apparatus connected to the direct current (DC) voltage changing device and connected to the resonant frequency detecting apparatus of power transmitting apparatus, the control apparatus configured to i) obtain a resonant frequency of the inverter detected by the resonant frequency detecting apparatus of the power transmitting apparatus, and ii) using the obtained resonant frequency of the inverter, control the DC voltage supplied from said DC voltage changing device to the electrical load, to set a combined impedance between an impedance associated with the electrical load and an impedance associated with said DC voltage changing device to a resonance point where the current phase difference between current of the power transmission unit of the power transmitting apparatus and current of the power reception unit is close to 180 degrees when the electric power is transmitted and received between the power transmission unit and the power reception unit.

* * * * *